US011939113B2

(12) United States Patent
Nieuwenhuis

(10) Patent No.: US 11,939,113 B2
(45) Date of Patent: Mar. 26, 2024

(54) T-SHIRT BAG FOR POSITIONING DEVICE AND METHOD FOR MANUFACTURING T-SHIRT BAG

(71) Applicant: NIVERPLAST HOLDING B.V., Nijverdal (NL)

(72) Inventor: Gerrit Jan Nieuwenhuis, Haarle (NL)

(73) Assignee: NIVERPLAST HOLDING B.V., PD The Hague (NL)

( * ) Notice: Subject to any disclaimer, the term of this patent is extended or adjusted under 35 U.S.C. 154(b) by 0 days.

(21) Appl. No.: 17/624,868

(22) PCT Filed: Jul. 23, 2020

(86) PCT No.: PCT/NL2020/050484
§ 371 (c)(1),
(2) Date: Jan. 5, 2022

(87) PCT Pub. No.: WO2021/020965
PCT Pub. Date: Feb. 4, 2021

(65) Prior Publication Data
US 2022/0258923 A1 Aug. 18, 2022

(30) Foreign Application Priority Data
Jul. 30, 2019 (NL) ..................................... 1043347

(51) Int. Cl.
*B65D 33/00* (2006.01)
*B31B 70/86* (2017.01)
(Continued)

(52) U.S. Cl.
CPC .......... *B65D 33/001* (2013.01); *B31B 70/874* (2017.08); *B31B 70/876* (2017.08);
(Continued)

(58) Field of Classification Search
CPC ..... B65D 33/001; B65D 31/10; B65D 33/065
(Continued)

(56) References Cited

U.S. PATENT DOCUMENTS 4,676,378 A 6/1987 Baxley
RE33,264 E * 7/1990 Baxley ................ B65D 33/001 206/806
(Continued)

FOREIGN PATENT DOCUMENTS

EP 1510465 A1 3/2005
NL 1012033 C1 9/1999

OTHER PUBLICATIONS

International Search Report for corresponding application PCT/NL2020/050484 filed Jul. 23, 2020; dated Nov. 23, 2020.
(Continued)

*Primary Examiner* — Jes F Pascua
(74) *Attorney, Agent, or Firm* — CANTOR COLBURN LLP

(57) ABSTRACT

T-Shirt bag with a front foil layer, a rear foil layer and side folds, where the front foil layer and the rear foil layer and the two side folds at the bottom edge and at the top edge are joined together; and where at the top edge of the T-shirt bag two handles are formed by a recess, both handles being provided with a continuous suspension opening; where the
(Continued)

perforation openings with incisions and a spot connection are provided in the front foil layer and in the front side fold portions of each handle.

8 Claims, 3 Drawing Sheets

(51) Int. Cl.

| | |
|---|---|
| ***B65D 30/20*** | (2006.01) |
| ***B65D 33/06*** | (2006.01) |
| *B31B 155/00* | (2017.01) |
| *B31B 160/10* | (2017.01) |
| *B31B 160/20* | (2017.01) |

(52) U.S. Cl.
CPC ........... *B65D 31/10* (2013.01); *B65D 33/065* (2013.01); *B31B 2155/0012* (2017.08); *B31B 2155/003* (2017.08); *B31B 2160/10* (2017.08); *B31B 2160/20* (2017.08)

(58) Field of Classification Search
USPC .......................................................... 383/8, 9
See application file for complete search history.

(56) References Cited

U.S. PATENT DOCUMENTS

| | | | | |
|---|---|---|---|---|
| 4,995,860 | A * | 2/1991 | Wilfong, Jr. | B65D 33/14 493/204 |
| 5,269,605 | A * | 12/1993 | Nguyen | B65D 33/001 206/554 |
| 5,335,788 | A * | 8/1994 | Beasley | B65D 33/001 206/554 |
| 5,362,152 | A | 11/1994 | Fletcher | |
| 5,938,033 | A | 8/1999 | Huang | |
| 2005/0087542 | A1 * | 4/2005 | Bazbaz | B65D 33/001 221/33 |
| 2006/0180492 | A1 | 8/2006 | Nieuwenhuis | |
| 2009/0274396 | A1 | 11/2009 | Wilkerson | |
| 2010/0166340 | A1 | 7/2010 | Bailey | |
| 2011/0164836 | A1 | 7/2011 | Chen | |
| 2019/0030850 | A1 * | 1/2019 | Tan | B31B 70/14 |

OTHER PUBLICATIONS

Written Opinion of the International Searching Authority for corresponding application PCT/NL2020/050484 filed Jul. 23, 2020; dated Nov. 23, 2020.

* cited by examiner

T-SHIRT BAG FOR POSITIONING DEVICE AND METHOD FOR MANUFACTURING T-SHIRT BAG

The invention relates to a T-shirt bag for use in a positioning device.

The invention also relates to a method for manufacturing the T-shirt bag for use in a positioning device for opening, spreading and inserting a T-shirt bag into a holder (container).

A T-shirt carrying bag, or short: T-shirt bag, is a T-shirt-shaped foil bag with integrally formed handles, as described and shown in US2011/0164836 and U.S. Pat. No. 4,676,378. T-shirt bags (handle bag or vest shaped shopping bag) can be formed with or without side folds (pleated or gusseted bag) from tubular foil material. The top and bottom edges are sealed, after which a U-shaped part is cut out at the top of the bag. This creates a T-shirt bag with two handles. When using side folds, the open handles on the front and rear of the T-shirt bag include two layers of foil. Preferably, the T-shirt bags are made of a lightweight, flexible and strong thermoplastic material.

For manual removal of the T-shirt bags from a bundle, supports are used comprising pins that protrude through the handles of the T-shirt bags. This is described in, among others, U.S. Pat. Nos. 4,676,378 5,938,033 and US 2009/0274396. For this purpose, the handles are provided with a perforation or opening, so that the T-shirt bags can be slid onto the pins. To open and spread the bag for use as a shopping bag, for example, the front foil layer of the T-shirt bag is pulled off the bundle by hand, while the rear foil layer of the T-shirt bag remains in the same position on the pins. The T-shirt bag can now be opened and spread by its handles and be lifted off the pins with two hands, or filled through the opening at the top.

NL1012033 in the name of the applicant describes a method and a device for arranging a foil bag in a box or crate. The foil bags are provided with side folds and have an entirely open top side, because no weld or seal is provided on the top side. In NL1012033 the foil bags are opened and spread by the described device and then positioned and inserted into a holder, such as a box or a crate. One foil bag is applied per box or crate, whereby the upper edges of the foil bag are folded from the inside to the outside around the side walls of the box or crate. The foil bags are provided with two perforation openings, with which the bundle of foil bags can be mounted and be suspended on a set of support pins. NL1022290 in the name of the applicant discloses a foil bag for use in the device according to NL1012033, wherein the foil bag is provided with two perforation openings, and wherein incisions (cuts) are provided at the perforation openings of the front foil layer and of the front side fold portions, and wherein no incisions are provided in the rear foil layer and in the rear side fold portions. This allows the foil bag to be opened more easily by the positioning device, because the front perforation openings can be easily moved over the support pins, while the rear perforation openings are more difficult to move over the support pins because the rear perforation openings are provided with substantially the same diameter as the support pins, so that these rear perforation openings are slightly jammed, extending a light clamping force on the carrier pins encountering resistance when moving over the suspension pins.

Unlike foil bags, T-shirt bags are provided with a weld or heat seal on the top side. Consequently, the T-shirt bags cannot be inserted with the top edges folded into a holder such as a crate. A holder is an open square or rectangular container or crate with closed or open side walls, in which various articles can be stored. T-shirt bags are fitted with their handles in recesses in opposite top sides of the side walls of the holder. Often two or more T-shirt bags are arranged and suspended in a holder. Parts of the handles extend on the outside of the side walls of the holder. For opening, spreading, positioning and inserting a T-shirt bag in a holder, a positioning device is required which opens the T-shirt bag and also opens the two handles.

It has been found that the use of the perforation openings of NL1012022 causes problems in the positioning device for T-shirt bags because the side fold portions in the handles come loose from the front foil layer, so that the handles do not open properly and the gripping hooks and/or the handle spreader members of the opening mechanism of the positioning device cannot be properly inserted into the carrying apertures of the T-shirt bag.

It is therefore an object of the present invention to provide a T-shirt bag, which can be arranged on support pins in a bundle of T-shirt bags, and which can be easily and reliably opened at the handles at high frequency by an opening mechanism of a positioning device.

The invention provides a T-shirt bag comprising:

a front foil layer and a rear foil layer;

a left side fold and a right side fold, each comprising a front side fold portion and a rear side fold portion;

wherein the front foil layer and the rear foil layer and both side folds are joined at the bottom edge and the top edge; and wherein, at the top edge of the T-shirt bag, two handles are formed by a recess, extending from the top edge into the two side folds, forming a left and right carrying aperture;

wherein both handles are provided with a continuous suspension opening consisting of four perforation openings, so that the T-shirt bag is arranged to be suspended on a set of support pins;

wherein the perforation openings in the front foil layer and in the front side fold portions are provided with an incision extending from the perforation openings;

wherein each handle is provided with a spot connection between the front foil layer and the front side fold portions.

By providing a spot connection between the front foil layer and the left and right front side fold portions, the carrier apertures are more reliably opened on the support pins, allowing for better and more reliably inserting the opening mechanism for the carrying apertures of the positioning device into the carrying apertures.

In particular, the spot connection is selected from a glue joint, a weld joint, or a punch joint.

Preferably, the spot connection is provided near the suspension opening in the handle. In particular, the spot connection in the handle is provided between the top of the side fold and the suspension opening.

Providing the spot connection near the suspension opening has the advantage that the perforation openings in the front foil portions can easily be pushed jointly together over the (widened ends of the) support pins, so that the carrying apertures can be opened properly.

In a preferred embodiment the spot connection is in line with the incision of the perforation opening, preferably the incision essentially extends parallel to the side edge and perpendicular to the top edge of the T-shirt bag. In particular, the spot connection and the incision are opposite each other on the vertical axis of the perforation opening. It has been found that with these measures the incisions open easily and the front foil layers slide easily over the support pins and the bulge or widening at the end of the support pins, while the front foil layer and the front side folds do not shift relative to each other, so that the front perforation openings encounter equal resistance from the outer end of the carrier pins when opening the T-shirt bag and handles.

The invention also relates to a method for manufacturing a T-shirt bag for use in a T-shirt bag positioning device, comprising the steps of:

forming a foil bag with side folds from a tubular flexible foil;

sealing a piece of tubular foil to form a closed top edge and a closed bottom edge;

providing a recess extending from the top edge into the two side folds, so that a left and a right carrying aperture and left and right front handle parts and left and right rear handle parts are formed;

inserting punch plates into the two side folds from the outside;

providing perforation openings with an incision in the front foil layer and in both front side fold portions, and providing perforation openings without incisions in the rear foil layer and in the two rear side fold portions;

providing a spot weld between the front foil layer and the two front side fold portions.

By using punch plates in both side folds, perforation openings, as well as incisions and spot connections, can be provided in the front foil layer and in the front side fold portions, so that the front handle parts can be easily moved over the support pins and over the widening at the outer end of the support pins, and the T-shirt bag can be opened by means of gripping hooks and the handle spreaders of the opening mechanism of the positioning device.

EXEMPLARY EMBODIMENT

Figure 1:
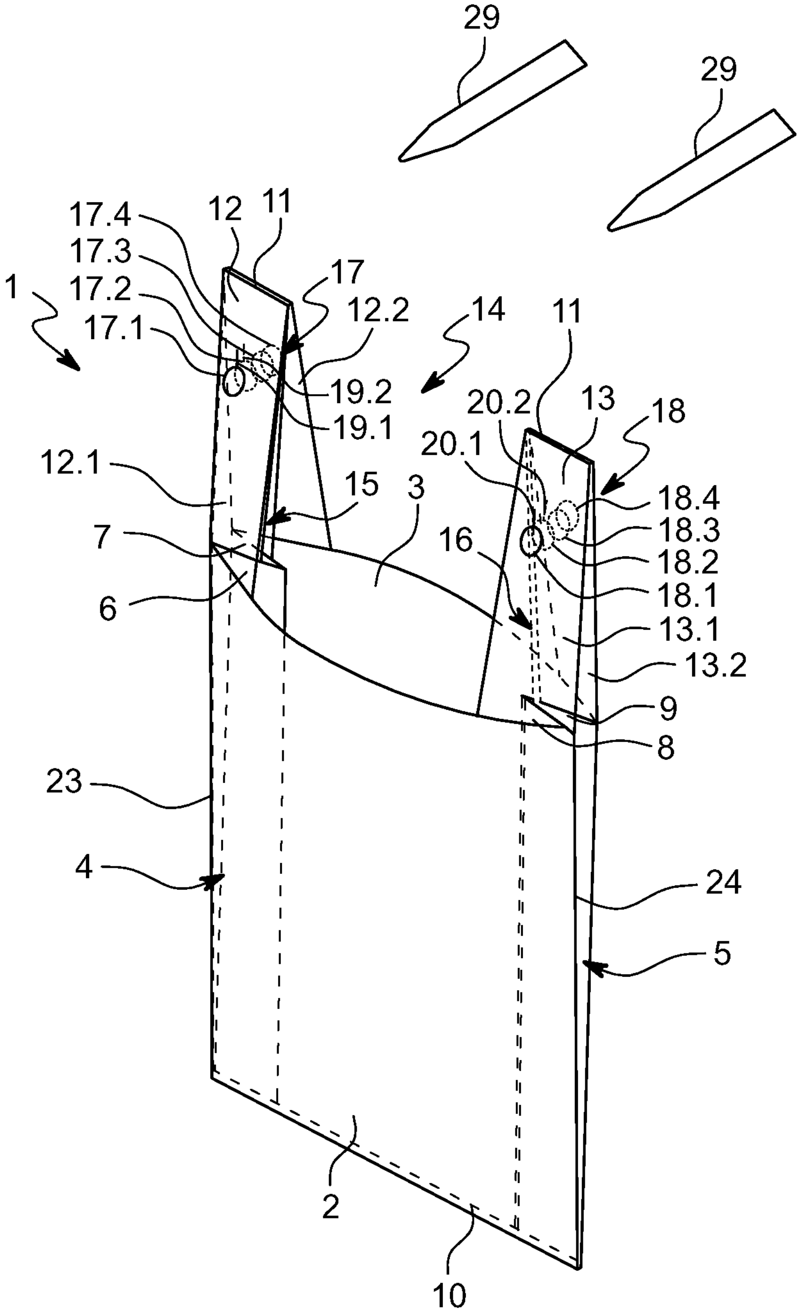
FIG. 1 shows a T-shirt bag for use in a T-shirt bag positioning device.

In FIG. 1 a T-shirt bag 1 is shown, which can be suspended in a T-shirt bag positioning device by means of support pins 29. The T-shirt bag 1 comprises a front foil layer 2, a rear foil layer 3, a left side fold 4 and a right side fold 5, each having a front side fold portion 6, 8 and a rear side fold portion 7, 9. Such T-shirt bags are manufactured as foil bags from a tubular foil, from which individual foil bags are manufactured by means of bottom/top welds/seals at the bottom edge and the top edge. When side folds (gussets) are applied, the side folds are also joined at their bottom edge and top edge to the front and rear foil layers. Because the foil bag is manufactured from a single piece of tubular foil, the different foil layers of the foil bag will be substantially identical in composition and physical properties including foil thickness.

In FIG. 1 it is shown, that the front foil layer 2 and the rear foil layer 3 and the two side folds 4, 5 are joined together at the bottom edge 10 and the top edge 11. At the upper side of the T-shirt bag 1, two handles 12, 13 are formed by providing a recess 14, which extends from the top edge 11 into the two side folds 4, 5, so that a left and a right carrying aperture 15, 16 is formed by cutting out the fold connection between the front and rear side fold portions 6-7 and 8-9. The front foil layer 2 with the front side foil portions 6-8 form the front handle parts 12.1 and 13.1; the rear foil layer 3 with the rear side fold portions 7-9 form the rear handle parts 12.2 and 13.2. The two handles 12, 13 are provided with a continuous suspension opening 17, 18 consisting of four perforation openings 17.1, 17.2, 17.3, 17.4 in the left handle 12 and four perforation openings 18.1, 18.2, 18.3, 18.4 in the right handle 13, respectively for the front foil layer 2, the front side fold portions 6, 8, the rear side fold portions 7, 9 and the rear foil layer 3. As a result, the T-shirt bag 1 is arranged and suitable to be suspended on a set of supporting pins 29.

The perforation openings 17.1, 17.2 in the left handle 12 and the perforation openings 18.1, 18.2 in the right handle 13 in the front foil layer 2 and in the front side fold portions 6, 8 are provided with an incision, 19.1, 19.2 in the left handle 12, and 20.1, 20.2 in the right handle 13 respectively. The incisions extend from the perforation openings 17.1, 17.2 on the left side and from the perforation openings 18.1, 18.2 on the right side. These incisions allow the front foil layer 2 and the front side fold portions 6, 8 of the handles 12, 13 to slide more easily over the support pins 29 and over the protrusion (bulge) or the widening of the end of the support pins than the rear foil layer 3 and the rear side fold portions 7, 9 of the handles. This is advantageous for a foil bag without handles, because it makes it easy to open the foil bag, so that the spreader device can be introduced into the foil bag. In the case of a T-shirt bag with two handles 12, 13, it is a disadvantage that the suspension openings 17, 18 are provided in the narrow parts of the T-shirt bag, in the two handles 12, 13. Therefore, the displacement of the front side fold portions 6, 8 over the support pins 29 and over the widening at the end of the support pins is uncontrolled and random due to the presence of the incisions 17.2, 18.2. The front side fold portions 6, 8 will often remain on the widening at the end of the support pins and thus completely or partially close the carrying apertures 15, 16 again, so that the gripping hooks of the opening mechanism of the positioning device can not be inserted properly into the carrying apertures of the handles, and the handle spreader members cannot reliably open and tension the handles of the T-shirt bag.

Figure 2:
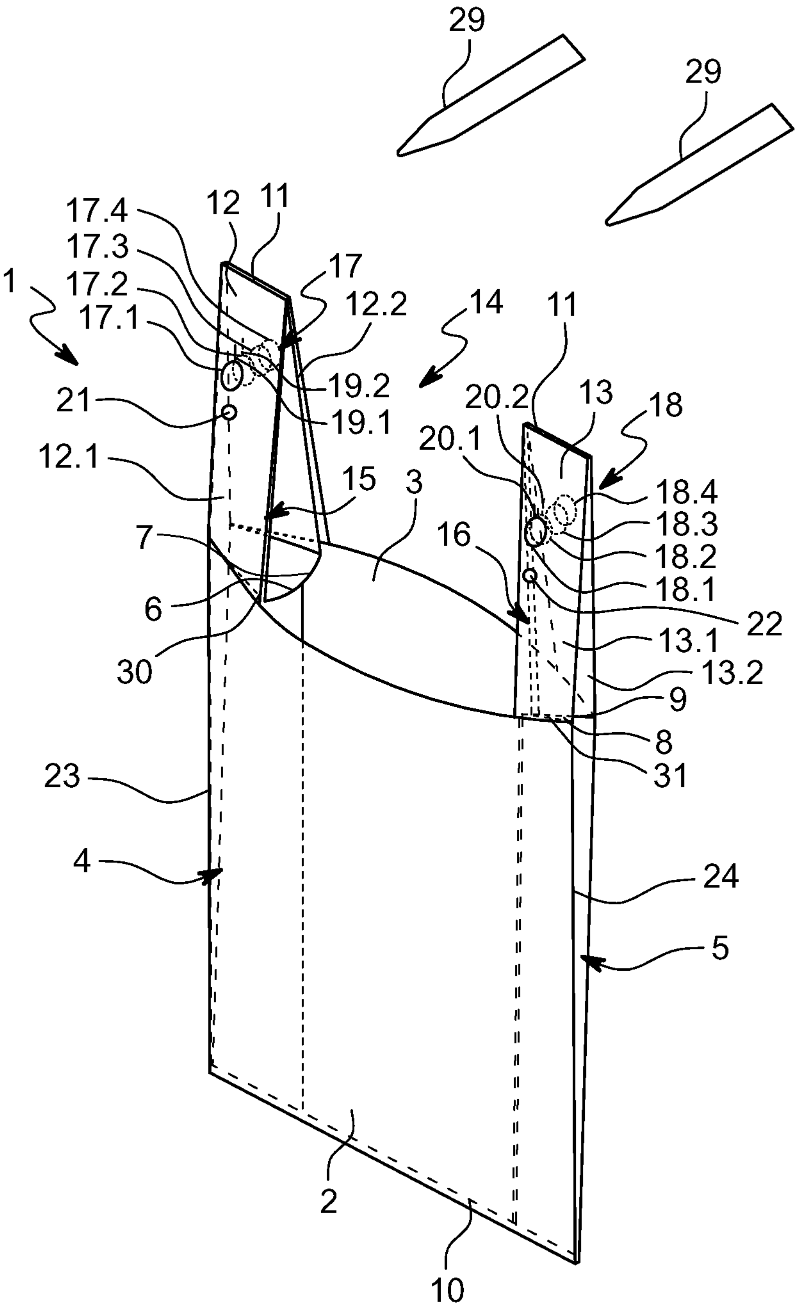
FIG. 2 shows the T-shirt bag of FIG. 1, with spot connections near the suspension openings in the handles.

In FIG. 2 it is shown that in each handle 12, 13 a spot connection 21, 22 is provided between the front foil layer 2 and the front side fold portions 6, 8. It has been found that by providing spot connections 21, 22 in the handles the sideways insertion of the gripping hooks of the opening mechanism of the positioning device into the carrying apertures 15, 16 of the T-shirt bag can be performed with high reliability and high frequency.

For example, the spot connection 21, 22 can be applied as a glue joint, a weld joint, or a punch joint; for example, simultaneously with the provision of the perforation openings and the incisions.

When the spot connections 21, 22 are provided near the suspension openings 17, 18 in the handles 12, 13, the front foil layer 2 and the front side fold portions 6, 8 slide jointly together, with equal resistance, over the widened end of the support pins 29, without shifting of the foil layers relative to each other. By providing the spot connection 21, 22 in the handles 12, 13 between the top sides 30, 31 of the side folds 4, 5 and the suspension openings 17, 18, the handles 12, 13 are opened more reliably. It has been found that by providing the spot connection 21, 22 in line with the incisions 19.1, 19.2; 20.1, 20.2 of the perforation openings 17.1, 17.2; 18.1, 18.2, the perforation openings 17.1, 18.1 in the front foil layer and the perforation openings 17.2, 18.2 in the front side fold portions 6, 8 remain even better in line with each other, so that the front handle parts 12.1 and 13.1 evenly and without encountering much resistance can be moved with its perforation openings 17.1, 17.2, 18.1, 18.2 and incisions 19.1, 19.2, 20.1, 20.2 over (the widened ends of) the support pins 29. It has been found that when the incisions 19.1, 19.2; 20.1, 20.2 extend essentially parallel to the side edge 23, 24 and extend essentially perpendicular to the top edge 11 of the T-shirt bag, the handles 12, 13 can be opened very smoothly, with minor disturbances or errors during the insertion into the carrying apertures of the gripping hooks and/or the handle spreader members of the positioning device.

Very good results are obtained with T-shirt bags in a positioning device, wherein the spot connections 21, 22 and the incisions 19.1, 19.2; 20.1, 20.2 are provided on the vertical axis of the respective perforation openings 17.1, 17.2; 18.1, 18.2.

Figure 3:
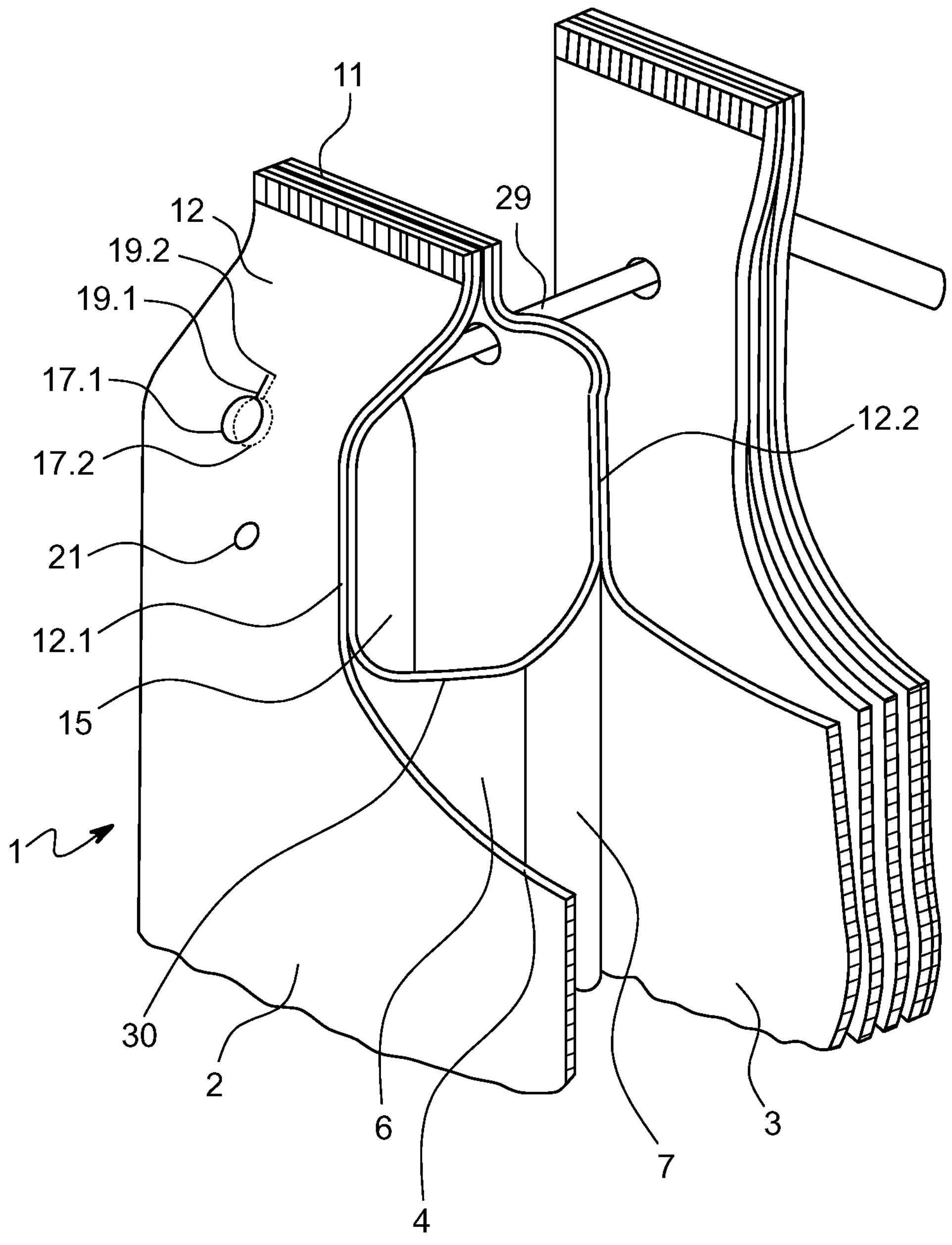
FIG. 3 shows in more detail the left handle of an opened T-shirt bag on a support pin.

In FIG. 3, the left handle 12 of the T-shirt bag 1 of FIG. 2 is shown in more detail. The rear handle part 12.2 is still suspended on the support pin 29, which may be provided with a protrusion (bulge) or widened end. The front handle part 12.1 has already been pulled off the support pins. The spot connection 21 is provided in the section of the front foil layer 2, which is located between the top side 30 of the left side fold 4 and the front perforation opening 17.1. As a result, the front side fold portion 6 in the handle 12 abuts the front foil layer 2, so that a large spacious left carrying aperture 15 is formed for the opening mechanism of the T-shirt bag positioning device.

The T-shirt bag for use in a crate by means of a T-shirt bag positioning device can be manufactured with the following inventive method.

First of all, a foil bag is formed with side folds (gussets) 4, 5 from a tubular flexible foil. To this end, a piece of tubular foil is provided with a closed top edge 11 and a closed bottom edge 10 by means of sealing (hot welding). Subsequently, a recess 14 is provided, extending from the top edge 11 into the two side folds 4, 5, so that a left and a right carrying aperture 15, 16 and left and right front handle parts 12.1, 13.1 and left and right rear handle parts 12.2, 13.2 are formed. Then, punch plates are inserted into the two side folds 4, 5 from the outside of the two side edges 23, 24, so that incisions and openings, different from those in the rear side fold portion and the rear foil layer, can be provided in the front side fold portion and the front foil layer.

In the front foil layer 2 and in the two front side fold portions 6, 8 of the front handle parts 12.1 and 13.1, perforation openings 17.1, 17.2; 18.1, 18.2 with incisions 19.1, 19.2; 20.1, 20.2 are applied. In the rear foil layer 3 and in the two rear side fold portions 7, 9 the perforation openings 17.3, 17.4; 18.3, 18.4 are provided without incisions. Subsequently, or simultaneously, spot connections 21, 22 are provided between the front foil layer 2 and the two front side folds portions 6, 8 of the front handle parts 12.1, 13.1. Preferably, the spot connections 21, 22 are provided under the front perforation openings 17.1, 17.2; 18.1, 18.2 but above the top edges 30, 31 of the side folds 4, 5, so that the front parts of the T-shirt bag slide easily over the (widened ends of the) support pins, and the front handle parts 12.1 and 13.1 can be easily separated from the rear handle parts 12.2 and 13.2.

When the incisions 19.1, 19.2; 20.1, 20.2 extend essentially parallel to the side edges 23, 24 and extend perpendicularly in the direction of the top edge 11 of the T-shirt bag, in combination with the spot connections 21, 22, a T-shirt bag is formed, which has a low failure and error rate when applied in a positioning device.

By providing the spot connections and the incisions opposite to each other on the vertical axis of the perforation openings 17.1, 17.2; 18.1, 18.2 in the front foil and in the front side fold portions, a T-shirt bag is obtained, wherein the handles can be easily and reliably opened, spread and inserted into a holder such as a crate, by a T-shirt bag positioning device.

The invention claimed is:

1. T-shirt bag comprising:

a front foil layer;

a rear foil layer; and a left side fold and a right side fold, each comprising a front side fold portion and a rear side fold portion;

wherein the front foil layer and the rear foil layer and both side folds are joined at a bottom edge of the T-shirt bag and at a top edge of the T-shirt bag;

wherein, at the top edge of the T-shirt bag, two handles are formed by a recess, extending from the top edge into the two side folds, forming a left and right carrying aperture;

wherein both handles are provided with a continuous suspension opening consisting of four perforation openings, so that the T-shirt bag is arranged to be suspended on a set of support pins;

wherein the perforation openings in the front foil layer and in the front side fold portions are provided with an incision extending from the perforation openings;

wherein each handle is provided with a spot weld between the front foil layer and the front side fold portions, the spot welds terminating at the front side fold portions and not extending to the rear side fold portions nor to the rear foil layer.

2. T-Shirt bag according to claim 1, wherein the spot weld comprises a glue joint, a weld joint, or a punch joint.

3. T-Shirt bag according to claim 1, wherein the spot weld is arranged near the suspension opening in the handle.

4. T-Shirt bag according to claim 3, wherein the spot weld is in line with the incision of the perforation opening.

5. T-Shirt bag according to claim 4, wherein the incision essentially extends parallel to the side edge, and perpendicular to the top edge, of the T-shirt bag.

6. T-Shirt bag according to claim 1, wherein the spot weld is provided in the handle between the a top side of the side fold and the suspension opening.

7. T-Shirt bag according to claim 6, wherein the spot weld and the incision are opposite each other on a vertical axis of the perforation opening.

8. A method for manufacturing the T-shirt bag of claim 1 for use in a T-shirt bag positioning device, comprising the steps of:

forming a foil bag with the side folds from a tubular flexible foil;

sealing a piece of tubular foil to form the closed top edge and the closed bottom edge;

providing the recess extending from the top edge into the two side folds, so that the left and a right carrying aperture and left and right front handle parts and left and right rear handle parts are formed;

inserting punch plates into the two side folds from outside;

providing perforation openings with the incision in the front foil layer and in both front side fold portions, and providing perforation openings without incisions in the rear foil layer and in the two rear side fold portions; and providing the spot weld between the front foil layer and the two front side fold portions.

* * * * *